United States Patent [19]
Novosad

[11] 3,782,735
[45] Jan. 1, 1974

[54] BANDED SEALING WASHER

[75] Inventor: Eugene Novosad, Arlington Heights, Ill.

[73] Assignee: Crane Packing Company, Morton Grove, Ill.

[22] Filed: July 6, 1971

[21] Appl. No.: 159,752

[52] U.S. Cl. ..................... 277/22, 277/88, 277/92
[51] Int. Cl. ............................................. F16j 15/16
[58] Field of Search .................. 277/22, 26, 96, 88, 277/92, 81, 81 S

[56] References Cited
UNITED STATES PATENTS

| | | | |
|---|---|---|---|
| 2,995,390 | 8/1961 | Gardner | 277/26 |
| 2,249,930 | 7/1941 | Bailey et al. | 277/96 X |
| 2,948,555 | 8/1960 | Wright | 277/26 |
| 2,840,350 | 6/1958 | Pierce | 277/22 X |
| 3,578,345 | 5/1971 | Copes | 277/81 S |

*Primary Examiner*—Samuel B. Rothberg
*Attorney*—Charles F. Voytech

[57] ABSTRACT

A sealing washer for rotary mechanical seals, said washer being made of a hard brittle material such as ceramic and subject to cracking and disintegration under thermal shock, the washer being protected against unequal expansion due to such thermal shock by a metal band formed as a stamping and tapered so that at one end it is expanded over the washer and at its other end it has a slight clearance with respect to the washer. The band is made rigid to retain its shape by forming a radial flange at its larger end and a radius at the base of the flange serves to locate the washer in the band during assembly. The band is made to have a coefficient of expansion which is substantially the same as that of the washer.

5 Claims, 4 Drawing Figures

PATENTED JAN 1 1974 3,782,735
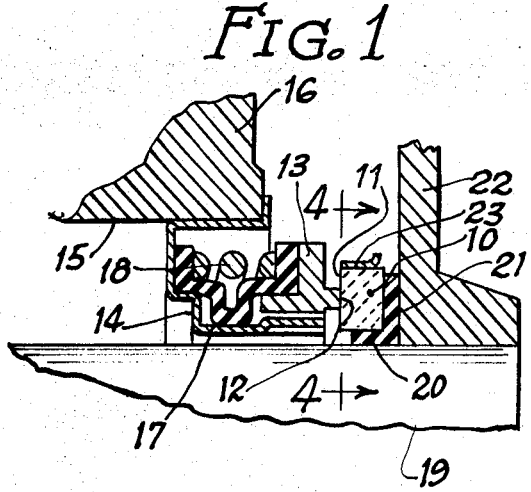
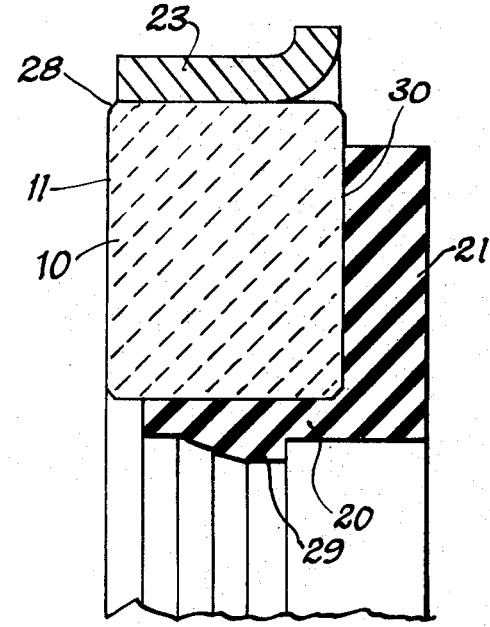
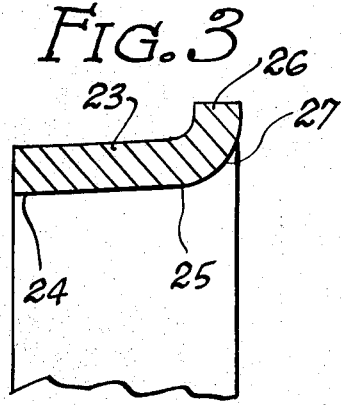
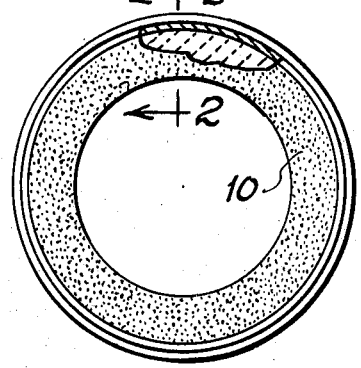
INVENTOR
Eugene Novosad
by Charles F. Voytech
Att'y

BANDED SEALING WASHER

This invention relates to rotary mechanical seals and particularly to certain sealing washers used therein.

Rotary mechanical seals are used to prevent leakage of fluids along the shaft of a pump or the like at the point where said shaft extends to the exterior of the housing for the pump. Such seals use as running seal surfaces a pair of contacting washers one of which is sealed to the shaft and the other is sealed to the housing. For long life, the materials of the sealing washers should be dissimilar and selected to be compatible with the fluid sealed. For certain fluids, such as water, one of the washers should be made of carbon and the other of a hard, rigid material such as ceramic. Unfortunately, ceramics are brittle and can withstand only very limited tensile stress.

When a mechanical seal is used in a water pump for the cooling system of an internal combustion engine, it is subjected to large variations in temperature commonly known as thermal shock. Such shock causes the brittle ceramic material to expand unevenly, setting up uneven tensile stresses which cause the material to crack and the seal to fail.

It is an object of this invention to provide means for enabling the material of a sealing washer to withstand thermal shock without destroying the effectiveness of the seal of which the washer is a part.

It is a more specific object of this invention to provide a sealing washer made of ceramic material, the outer surface of which is encased in an endless band of heat-conducting material, said band being pressed or shrunk fitted upon the outer surface of the washer and having an outwardly extending fin thereon for transferring heat from said band to the surrounding atmosphere.

For another specific object this invention has within its purview the provision of a sealing washer made of hard brittle material the strength of which in tension is greatly increased by the use of a metal band pressed upon the exterior surface of the washer, the band being formed to retain its circular shape for easy insertion of the washer thereinto and yet being distortable to expand over the washer and exert a compressive stress thereon.

A further specific object this invention has within its purview the provision of an endless band for a washer of brittle material to protect such material against uneven expansion due to thermal shock, said band being tapered and having at its larger end an outwardly turned radius terminating in a flange the small end of the band having an interference fit with the washer surrounded thereby, but the large end being a slip fit on the washer and furthermore being rigid to retain its round shape during handling so that the washer can readily enter the ring and pass to the narrow end thereof.

These and other objects of this invention will become apparent from the following description when taken together with the accompanying drawings in which:

FIG. 1 is a quarter section taken axially through an illustrative rotary mechanical seal utilizing a sealing washer and band made in accordance with this invention;

FIG. 2 is a greatly enlarged section through the sealing washer and band of FIG. 1 before installation on a shaft, the section being taken along line 2—2 of FIG. 4;

FIG. 3 is a section corresponding to that of FIG. 2 taken through the band before the latter is installed on a washer; and FIG. 4 is an end elevational view of the washer and band of FIG. 1 taken along line 4—4 of FIG. 1.

In the embodiment selected to illustrate this invention, the washer is an endless ring 10 of rectangular radial cross section having a flat and smooth radially disposed sealing surface 11 against which bears a similarly flat and smooth radially disposed sealing surface 12 of a washer 13 mounted for axial, non-rotative movement in a stamped metal retainer 14 pressed into a bore 15 of a housing 16 of a pump or the like. A flexible resilient bellows member 17 is pressed against washer 13 on the one hand and against retainer 14 on the other by a spring 18 to effect a fluid-tight seal between the washer and retainer, the latter in turn being sealed to housing 16 by the aforesaid press fit in bore 15 thereof.

Washer 10 is sealed with respect to the shaft 19 of the pump by a flanged flexible resilient ring 20 interposed between ring 10 and shaft 19 by an interference or press fit. The flange 21 on ring 20 seals washer 10 with respect to the hub of a pump impeller 22 by virtue of an initial axial pressure exerted thereon by the installation of ring 20 on shaft 10, and by the continued axial pressure of spring 18 exerted on ring 10 through washer 13 and bellows 17.

It is contemplated that the fluid handled by the pump impeller 22 will be a liquid such as water and furthermore, that the water will be used to cool an internal combustion engine for an automotive vehicle. Thus the water may be subjected to sudden changes in temperature as during warm-up after starting in cold weather, which in turn subjects the seal including washer 10 to thermal shock. For long seal life, it has been found that washer 10 should be made of a hard ceramic material, but such material is not suited to withstand thermal shocks without cracking and disintegrating under the centrifugal forces developed in it by the rotation of shaft 19, the speed of which may reach 3,000 r.p.m. or higher.

One means proposed to obviate the cracking and disintegration of the ceramic washer is to shrink a heavy machined metal ring upon the exterior surface of the washer. This requires precise dimensioning of the inside diameter of the ring and of the outside diameter of the ceramic washer, both of which are costly, as is also the heating and shrinking operation after the ring is formed. It has also been proposed to protect a carbon sealing washer against cracking and disintegrating by pressing a stamped cylindrical band upon the outside surface of the carbon washer, but as proposed, the problem of precise dimensioning of the band and washer was still present, and an added problem of maintaining the circular shape of the band prior to pressing upon the washer was introduced.

In the present invention, a metal band 23 is used to protect ceramic washer 10, but its construction is such that the defects in the prior stamped band and rigid machined ring are obviated. The band is shown in FIG. 3 in its free state prior to its assembly over ceramic ring 10. It is a stamping of metal selected to have a coefficient of expansion which is substantially the same as that of ring 10. A commercially available form of Invar known as Carpenter Low Expansion 42 has been found to be satisfactory. The band is formed with a taper to have an interference fit at end 24 and to be oversized by about 0.001 inch at its other end 25 which is the starting end in the operation of assembling the band over the washer. Said starting end 25 additionally is flared outwardly to form a short radially disposed flange 26 and a connecting radius 27.

Flange 26 serves to give the band 23 stiffness to retain its round shape during assembly upon ceramic washer 10, a difficulty experienced with the prior art band. The radius 27 simplifies centering the entering washer 10 relative to band 20. Since flange 26 is stiff in a radial direction, it resists expansion, and hence the clearance of at least 0.001 inch between the band and washer at that end obviates the necessity of expanding said end. The taper insures that, without the need for close tolerances, a sufficient portion of the band will have to be expanded over the washer to provide the requisite radial inward pressure to resist thermal cracking and disintegration of the ceramic washer 10. Flange 26 also provides a means for gripping band 23 while it is drawn over washer 10, and it also assists in dissipating heat from washer 10 into the fluid being pumped, which in the case of an internal combustion engine, would be continuously cooled by a fan and radiator.

When the band 23 is assembled upon a ceramic washer 10 as shown in FIG. 2, said washer 10 is then slipped over the resilient ring 20, and the entire assembly is pressed upon shaft 19 from the right-hand end thereof as viewed in FIG. 1 ahead of impeller 22. An internal rib 29 may be formed in ring 20 to decrease the need for unduly close tolerances between ceramic ring 10, ring 20 and shaft 19.

Although this invention has been described with reference to a ceramic washer and an invar-type metal band passing therearound it is applicable generally to any hard frangible material, the band material being selected to have a coefficient of expansion as close to that of the material as possible.

Thus with the band assembled over the ceramic washer, an interference fit is created causing the ceramic washer 10 to be in a state of compression. When the temperature of the washer is changed, the washer will expand if the change is upward and contract if the change is downward. A rapid change in temperature produces a thermal shock which in the case of ceramic materials, would normally result in cracking the material. The use of band 23 around the washer 10 to keep the washer in a constant state of compression increases the resistance of the washer to thermal shock effects to the point where cracking does not take place.

Where the washer 10 is a sealing washer, as in the foregoing illustrative embodiment, face 11 will be finished flat and smooth, but the opposite face 20 need not be finished. In such seal application it is desirable to have the left-hand edge of band 23 as viewed in FIG. 2 brought as close to face 11 as possible since this is the part of washer 10 that is most exposed to the temperature changes produced by friction with face 12 of washer 13 and flow of pumpage.

Although this invention has been described in its application to washers having a circular transverse section, it is understood that it can be applied with equal effectiveness to washers having polygonal transverse sections such as hexagons, octagons, etc.

I claim:

1. In combination, a sealing washer for a rotary mechanical seal, said washer being comprised of a frangible material having an outer surface and a radially disposed sealing surface, and an endless metal band surrounding the sealing washer and having a contour corresponding to the contour of the said outer surface of the sealing washer and an inside dimension in its free state over a portion of its axial length which is smaller than the corresponding outside dimension of the washer, the remainder of its axial length having an inside dimension in its installed state which is greater than the corresponding outside dimension of the washer, said endless metal band acting upon said outer surface for placing the washer in radial compression at one end of said band and for transferring heat from said washer to the surrounding atmosphere at its opposite end.

2. The combination described in claim 1, said outside surface of the washer being cylindrical and the inside surface of the said unitary means being tapered in its free state, the smallest diameter of the tapered inside surface being less than the diameter of the outside surface of said washer, and the greatest diameter of the tapered inside surface being greater than the said diameter of the outside surface of said washer.

3. The combination described in claim 2, said means for transferring heat from said frangible material to the surrounding atmosphere comprising a fin extending outwardly from the greatest diameter of the tapered inside surface.

4. The combination described in claim 2, said unitary means comprising a metal stamping, said means for transferring heat from said frangible material comprising a fin on the stamping of the same thickness as the unitary means and connected thereto by a radius which guides the washer into said stamping.

5. The combination described in claim 1, said unitary means having substantially the same coefficient of thermal expansion as the washer.

* * * * *

UNITED STATES PATENT OFFICE
CERTIFICATE OF CORRECTION

PO-1050
(5/69)

Patent No. 3,782,735    Dated January 1, 1974

Inventor(s) Eugene Novosad

It is certified that error appears in the above-identified patent and that said Letters Patent are hereby corrected as shown below:

In the Claims:

Col. 4, lines 32, 43-44, 47 and 49-50 - change "unitary means" to -- endless metal band -- .

Signed and sealed this 10th day of December 1974.

(SEAL)
Attest:

McCOY M. GIBSON JR.
Attesting Officer

C. MARSHALL DANN
Commissioner of Patents